US011319243B2

(12) United States Patent
Guo et al.

(10) Patent No.: US 11,319,243 B2
(45) Date of Patent: May 3, 2022

(54) HIGH REFRACTIVE INDEX OPTICAL BORATE GLASS

(71) Applicant: Corning Incorporated, Corning, NY (US)

(72) Inventors: Xiaoju Guo, Painted Post, NY (US); Lina Ma, Corning, NY (US); Paulo Jorge Gaspar Marques, Fontainebleau (FR); Zhongzhi Tang, Santa Clara, CA (US)

(73) Assignee: Corning Incorporated, Corning, NY (US)

( * ) Notice: Subject to any disclaimer, the term of this patent is extended or adjusted under 35 U.S.C. 154(b) by 458 days.

(21) Appl. No.: 16/247,161

(22) Filed: Jan. 14, 2019

(65) Prior Publication Data

US 2019/0218137 A1    Jul. 18, 2019

Related U.S. Application Data

(60) Provisional application No. 62/618,329, filed on Jan. 17, 2018.

(51) Int. Cl.
*C03C 3/155* (2006.01)
*C03C 3/068* (2006.01)
*C03C 13/04* (2006.01)
*C03C 3/064* (2006.01)

(52) U.S. Cl.
CPC .............. *C03C 3/155* (2013.01); *C03C 3/064* (2013.01); *C03C 3/068* (2013.01); *C03C 13/045* (2013.01); *C03C 13/048* (2013.01); *C03C 2213/00* (2013.01)

(58) Field of Classification Search
CPC ................................ C03C 3/155; C03C 3/064
See application file for complete search history.

(56) References Cited

U.S. PATENT DOCUMENTS

| | | | |
|---|---|---|---|
| 4,120,732 A | 10/1978 | Komorita et al. | |
| 4,612,295 A | 9/1986 | Sagara | |
| 4,996,173 A | 2/1991 | Tachiwana | |
| 5,858,898 A | 1/1999 | Nakahara et al. | |
| 6,645,894 B2 | 11/2003 | Endo | |
| 6,653,251 B2 | 11/2003 | Sugimoto et al. | |
| 6,818,578 B2 | 11/2004 | Tachiwama | |
| 6,912,093 B2 | 6/2005 | Endo | |
| 6,977,232 B2 | 12/2005 | Hayashi et al. | |
| 7,138,349 B2 | 11/2006 | Uehara et al. | |
| 7,297,647 B2 | 11/2007 | Wolff et al. | |
| 7,309,670 B2 | 12/2007 | Fujiwara et al. | |
| 7,320,949 B2 | 1/2008 | Uehara | |
| 7,490,485 B2 | 2/2009 | Endo | |
| 7,491,667 B2 | 2/2009 | Hayashi | |
| 7,501,366 B2 | 3/2009 | Wolff et al. | |
| 7,501,369 B2 | 3/2009 | Tachiwana | |
| 7,514,381 B2 | 4/2009 | Matsumoto et al. | |
| 7,524,781 B2 | 4/2009 | Nagashima et al. | |
| 7,553,785 B2 | 6/2009 | Ritter et al. | |
| 7,576,020 B2 | 8/2009 | Hayashi | |
| 7,598,193 B2 | 10/2009 | Endo | |
| 7,638,450 B2 | 12/2009 | Ritter et al. | |
| 7,655,585 B2 | 2/2010 | Hayashi | |
| 7,670,973 B2 | 3/2010 | Ritter et al. | |
| 7,737,064 B2 | 6/2010 | Fu | |
| 7,827,823 B2 | 11/2010 | Kasuga et al. | |
| 7,867,934 B2 | 1/2011 | Nagaoka | |
| 7,932,197 B2 | 4/2011 | Hayashi | |
| 7,998,891 B2 | 8/2011 | Fu | |
| 8,034,733 B2 | 10/2011 | Kobayashi et al. | |
| 8,110,514 B2 | 2/2012 | Negishi et al. | |
| 8,114,796 B2 | 2/2012 | Ritter et al. | |
| 8,187,986 B2 | 5/2012 | Fu | |
| 8,207,075 B2 | 6/2012 | Uehara et al. | |

(Continued)

FOREIGN PATENT DOCUMENTS

| | | | |
|---|---|---|---|
| CA | 2398456 A1 | 8/2001 | |
| CA | 2527308 A1 | 12/2004 | |

(Continued)

OTHER PUBLICATIONS

International Search Report and Written Opinion PCT/US2019/013730 dated Mar. 25, 2019, 11 Pgs.
Ehrt; "Structure, Properties and Applications of Borate Glasses"; Glass Tech, 41 (6); (2000) pp. 182-185.
Hovhannisyan; "Phase Diagram of the Ternary BaO—Bi2O3—B2O3 System: New Compounds and Glass Ceramics Characterisation"; Advanves in Ferroelectrics Chapter 7; (2012), pp. 127-162.
Oprea et al; "Optical Properties of Bismuth Borate Glasses"; Optical Materials, 26 (2004) pp. 235-237.
Rao et al; "Optical Properties of Alkaline Earth Borate Glasses"; International Journal of Engineering, Science and Technology; vol. 4, No. 4 (2012) pp. 25-35.
Singh et al; "Bismuth Oxide and Bismuth Oxide Doped Glasses for Optical and Photonic Applications"; in Bismuth: Characteristics, Prodiction and Applications, Materials Science & Technologies, Chapter 9, (2012) 18 Pages.

(Continued)

*Primary Examiner* — Elizabeth A. Bolden

(57) ABSTRACT

A borate glass includes from 25.0 mol % to 70.0 mol % $B_2O_3$; from 0.0 mol % to 10.0 mol % $SiO_2$; from 0.0 mol % to 15.0 mol % $Al_2O_3$; from 3.0 mol % to 15.0 mol % $Nb_2O_5$; from 0.0 mol % to 12.0 mol % alkali metal oxides; from 0.0 mol % to 5.0 mol % ZnO; from 0.0 mol % to 8.0 mol % $ZrO_2$; from 0.0 mol % to 15.0 mol % $TiO_2$; less than 0.5 mol % $Bi_2O_3$; and less than 0.5 mol % $P_2O_5$. The optical borate glass includes a sum of $B_2O_3+Al_2O_3+SiO_2$ from 35.0 mol % to 76.0 mol %, a sum of CaO+MgO from 0.0 mol % to 35.5 mol %. The borate glass has a refractive index, measured at 587.6 nm, of greater than 1.70, a density of less than 4.50 g/cm³, and an Abbe number, $V_D$, from 20.0 to 47.0.

20 Claims, No Drawings

(56) References Cited

U.S. PATENT DOCUMENTS

| | | | |
|---|---|---|---|
| 8,273,672 B2 | 9/2012 | Nagaoka et al. | |
| 8,404,606 B2 | 3/2013 | Wolff et al. | |
| 8,410,008 B2 | 4/2013 | Negishi et al. | |
| 8,424,344 B2 | 4/2013 | Zou et al. | |
| 8,466,075 B2 | 6/2013 | Shimizu | |
| 8,476,177 B2 | 7/2013 | Ritter et al. | |
| 8,647,996 B2 | 2/2014 | Takazawa | |
| 8,716,157 B2 | 5/2014 | Fujiwara et al. | |
| 8,728,963 B2 | 5/2014 | Negishi et al. | |
| 8,741,795 B2 | 6/2014 | Zou et al. | |
| 8,824,248 B2 | 9/2014 | Matsumoto et al. | |
| 8,956,988 B2 | 2/2015 | Fujiwara | |
| 9,007,878 B2 | 4/2015 | Matsumoto et al. | |
| 9,255,028 B2 | 2/2016 | Negishi et al. | |
| 9,284,216 B2 | 3/2016 | Wolff et al. | |
| 9,302,930 B2 | 4/2016 | Negishi et al. | |
| 2002/0006857 A1 | 1/2002 | Tachiwama | |
| 2003/0032542 A1 | 2/2003 | Endo | |
| 2003/0064878 A1 | 4/2003 | Sugimoto et al. | |
| 2004/0145815 A1 | 7/2004 | Endo | |
| 2005/0085371 A1 | 4/2005 | Tachiwama | |
| 2005/0209085 A1 | 9/2005 | Endo | |
| 2005/0209087 A1 | 9/2005 | Wolff et al. | |
| 2006/0100084 A1 | 5/2006 | Nagashima et al. | |
| 2006/0105900 A1 | 5/2006 | Kasuga et al. | |
| 2006/0247119 A1 | 11/2006 | Ritter et al. | |
| 2007/0042891 A1 | 2/2007 | Ritter et al. | |
| 2007/0105702 A1 | 5/2007 | Matsumoto et al. | |
| 2007/0225146 A1 | 9/2007 | Wolff et al. | |
| 2007/0249480 A1 | 10/2007 | Kobayashi et al. | |
| 2007/0249483 A1 | 10/2007 | Ritter et al. | |
| 2007/0262480 A1 | 11/2007 | Tachiwana | |
| 2008/0085826 A1 | 4/2008 | Ritter et al. | |
| 2008/0194395 A1 | 8/2008 | Endo | |
| 2009/0325779 A1 | 12/2009 | Negishi et al. | |
| 2010/0222199 A1 | 9/2010 | Wolff et al. | |
| 2011/0028300 A1 | 2/2011 | Zou et al. | |
| 2011/0136652 A1 | 6/2011 | Ritter et al. | |
| 2012/0100981 A1 | 4/2012 | Negishi et al. | |
| 2012/0238433 A1 | 9/2012 | Fujiwara et al. | |
| 2013/0178354 A1 | 7/2013 | Negishi et al. | |
| 2013/0210604 A1 | 8/2013 | Zou et al. | |
| 2013/0276880 A1 | 10/2013 | Wolff et al. | |
| 2014/0036644 A1 | 2/2014 | Matsumoto et al. | |
| 2014/0334276 A1 | 11/2014 | Matsumoto et al. | |
| 2015/0094198 A1 | 4/2015 | Wolff et al. | |
| 2015/0315064 A1 | 11/2015 | Wolff et al. | |
| 2015/0315066 A1 | 11/2015 | Wolff et al. | |

FOREIGN PATENT DOCUMENTS

| | | | |
|---|---|---|---|
| CN | 1237018 A | 12/1999 | |
| CN | 1308252 A | 8/2001 | |
| CN | 1326904 A | 12/2001 | |
| CN | 1377847 A | 11/2002 | |
| CN | 1524815 A | 9/2004 | |
| CN | 1660711 A | 8/2005 | |
| CN | 1876589 A | 12/2006 | |
| CN | 1915876 A | 2/2007 | |
| CN | 1944299 A | 4/2007 | |
| CN | 1955128 A | 5/2007 | |
| CN | 1968904 A | 5/2007 | |
| CN | 101012103 A | 8/2007 | |
| CN | 101041553 A | 9/2007 | |
| CN | 101058475 A | 10/2007 | |
| CN | 101172774 A | 5/2008 | |
| CN | 101492247 A | 7/2009 | |
| CN | 101613184 A | 12/2009 | |
| CN | 101932533 A | 12/2010 | |
| CN | 101948245 A | 1/2011 | |
| CN | 102161568 A | 8/2011 | |
| CN | 102858702 A | 1/2013 | |
| CN | 103189323 A | 7/2013 | |
| CN | 103351100 A | 10/2013 | |
| CN | 103351101 A | 10/2013 | |
| CN | 103502165 A | 1/2014 | |
| CN | 104250063 A | 12/2014 | |
| CN | 104303231 A | 1/2015 | |
| CN | 104513007 A | 4/2015 | |
| DE | 4222322 C1 * | 12/1993 | ............ C03C 3/068 |
| DE | 4222322 C1 | 12/1993 | |
| DE | 10126554 A1 | 1/2002 | |
| DE | 102004009930 A1 | 9/2005 | |
| DE | 60105978 T2 | 3/2006 | |
| DE | 102005020423 A1 | 11/2006 | |
| DE | 102006039287 A1 | 3/2007 | |
| DE | 102005039172 B3 | 4/2007 | |
| DE | 102005052090 A1 | 5/2007 | |
| DE | 102006013599 A1 | 9/2007 | |
| DE | 102007013453 A1 | 12/2007 | |
| DE | 102006047783 A1 | 4/2008 | |
| DE | 102007044851 B3 | 1/2009 | |
| DE | 102009010701 A1 | 9/2010 | |
| DE | 102009047511 A1 | 6/2011 | |
| DE | 102010042945 A1 | 4/2012 | |
| DE | 102013219683 A1 | 4/2015 | |
| DE | 102014109831 A1 | 1/2016 | |
| DE | 102014109832 A1 | 1/2016 | |
| EP | 1245544 A2 | 10/2002 | |
| EP | 1254869 A1 | 11/2002 | |
| EP | 1433757 A1 | 6/2004 | |
| EP | 1637506 A1 | 3/2006 | |
| EP | 2039662 A1 | 3/2009 | |
| EP | 2543645 A1 | 1/2013 | |
| EP | 2632867 A2 | 9/2013 | |
| FR | 2866873 A1 | 9/2005 | |
| FR | 2885127 A1 | 11/2006 | |
| FR | 2889844 A1 | 2/2007 | |
| FR | 2895739 A1 | 7/2007 | |
| GB | 1410073 A | 10/1975 | |
| GB | 2411398 A | 8/2005 | |
| JP | 60221338 A | 11/1985 | |
| JP | 60221338 A * | 11/1985 | ............ C03C 3/068 |
| JP | 62100449 A | 5/1987 | |
| JP | 2001-213636 A | 8/2001 | |
| JP | 2001-348244 A | 12/2001 | |
| JP | 2002-284542 A | 10/2002 | |
| JP | 2004-292299 A | 10/2004 | |
| JP | 2005-179142 A | 7/2005 | |
| JP | 2005-239544 A | 9/2005 | |
| JP | 3750984 B2 | 3/2006 | |
| JP | 2006-248897 A | 9/2006 | |
| JP | 2006-306717 A | 11/2006 | |
| JP | 2007-051060 A | 3/2007 | |
| JP | 2007-063071 A | 3/2007 | |
| JP | 2007-119343 A | 5/2007 | |
| JP | 2007-254197 A | 10/2007 | |
| JP | 2007-254280 A | 10/2007 | |
| JP | 4017832 B2 | 12/2007 | |
| JP | 2008-143773 A | 6/2008 | |
| JP | 4240721 B2 | 3/2009 | |
| JP | 4286652 B2 | 7/2009 | |
| JP | 2009-179510 A | 8/2009 | |
| JP | 4367019 B2 | 11/2009 | |
| JP | 2010-030879 A | 2/2010 | |
| JP | 4508987 B2 | 7/2010 | |
| JP | 4531718 B2 | 8/2010 | |
| JP | 2010-202508 A | 9/2010 | |
| JP | 2010-215503 A | 9/2010 | |
| JP | 4562041 B2 | 10/2010 | |
| JP | 4562746 B2 | 10/2010 | |
| JP | 4726666 B2 | 7/2011 | |
| JP | 4751623 B2 | 8/2011 | |
| JP | 2011-173783 A | 9/2011 | |
| JP | 4772621 B2 | 9/2011 | |
| JP | 2012-020929 A | 2/2012 | |
| JP | 2012-096992 A | 5/2012 | |
| JP | 4948569 B2 | 6/2012 | |
| JP | 2012-131703 A | 7/2012 | |
| JP | 4970896 B2 | 7/2012 | |
| JP | 5010418 B2 | 8/2012 | |
| JP | 2012-171848 A | 9/2012 | |
| JP | 5138401 B2 | 2/2013 | |
| JP | 2013-172247 A | 9/2013 | |

(56) References Cited

FOREIGN PATENT DOCUMENTS

| | | |
|---|---|---|
| JP | 2013-543832 A | 12/2013 |
| JP | 2014-511823 A | 5/2014 |
| JP | 5543395 B2 | 7/2014 |
| JP | 5658132 B2 | 1/2015 |
| JP | 5658469 B2 | 1/2015 |
| JP | 2015-067536 A | 4/2015 |
| JP | 2015-091752 A | 5/2015 |
| JP | 5744492 B2 | 7/2015 |
| JP | 5836471 B2 | 12/2015 |
| JP | 2016-029009 A | 3/2016 |
| JP | 5926479 B2 | 5/2016 |
| KR | 10-2006-0017756 A | 2/2006 |
| KR | 2006-0043189 A | 5/2006 |
| KR | 10-2006-0113433 A | 11/2006 |
| KR | 2007-0021050 A | 2/2007 |
| KR | 10-2007-0028427 A | 3/2007 |
| KR | 2007-0045999 A | 5/2007 |
| KR | 10-2007-0095786 A | 10/2007 |
| KR | 10-2008-0031817 A | 4/2008 |
| KR | 10-0938725 B1 | 1/2010 |
| KR | 2010-0002209 A | 1/2010 |
| KR | 10-2010-0098325 A | 9/2010 |
| KR | 2010-0107030 A | 10/2010 |
| KR | 10-2011-0063377 A | 6/2011 |
| KR | 1148429 B1 | 5/2012 |
| KR | 10-1177935 B1 | 8/2012 |
| KR | 10-2013-0083456 A | 7/2013 |
| KR | 10-1298373 B1 | 8/2013 |
| KR | 2014-0008994 A | 1/2014 |
| KR | 2014-0025481 A | 3/2014 |
| KR | 10-1389618 B1 | 4/2014 |
| KR | 10-1397215 B1 | 5/2014 |
| KR | 10-1441678 B1 | 9/2014 |
| KR | 10-1492546 B1 | 2/2015 |
| KR | 10-2016-0005314 A | 1/2016 |
| SG | 11201407592 Y | 1/2015 |
| TW | 550244 B | 9/2003 |
| TW | 200806599 A | 2/2008 |
| TW | 200831429 A | 8/2008 |
| TW | 201038502 A | 11/2010 |
| TW | I358397 B | 2/2012 |
| TW | 201247584 A | 12/2012 |
| TW | I382967 B | 1/2013 |
| TW | I396674 B | 5/2013 |
| TW | I404690 B | 8/2013 |
| TW | I404694 B | 8/2013 |
| TW | I477470 B | 3/2015 |
| WO | 01/55041 A1 | 8/2001 |
| WO | 2004/113244 A1 | 12/2004 |
| WO | 2006/001346 A1 | 1/2006 |
| WO | 2009/096439 A1 | 8/2009 |
| WO | 2012/055860 A2 | 5/2012 |
| WO | 2012/115038 A1 | 8/2012 |
| WO | 2012143452 A1 | 10/2012 |
| WO | 2013/172247 A1 | 11/2013 |
| WO | 2014048362 A1 | 4/2014 |
| WO | 2016/008866 A1 | 1/2016 |
| WO | 2016/008867 A1 | 1/2016 |

OTHER PUBLICATIONS

Sun et al; "Novel Lithium-Barium-Lead-Bismuth Glasses"; Materials Letters, 59 (2005) pp. 959-962.

* cited by examiner

HIGH REFRACTIVE INDEX OPTICAL BORATE GLASS

This application claims the benefit of priority to U.S. Provisional Application Ser. No. 62/618,329 filed on Jan. 17, 2018, the content of which is relied upon and incorporated herein by reference in its entirety.

BACKGROUND

Field

The present specification generally relates to glass compositions suitable for use in optical displays, optical devices and optical fibers such as, for example, optical lens for optical instruments, displays for augmented reality (AR) devices or virtual reality (VR) devices. More specifically, the present specification is directed to borate glasses that may be used in displays for augmented reality devices or virtual reality devices.

Technical Background

In the recent decade, the demand of optical glasses with high refractive index (i.e., a refractive index (RI)>1.60) has increased with the growing market in augmented reality and virtual reality devices. Other requirements for these optical glasses used for augmented reality or virtual reality devices are good transmittance in the visible range, good glass formability, chemical durability, and relatively low production cost. The manufacturing of glasses with high refractive index is quite different from the production of display glasses, which do not require such a high refractive index. Molding is the typical method used to prepare optical objects, and usually, grinding and polishing are needed to achieve the desired surface properties, which may not be required in display glasses. Low liquidus temperatures benefit to the processing, for example, benefit to the mold life and energy saving. Accordingly, the demands of optical glasses are not the same as the demands of display glasses, and different glass compositions may be required for optical glasses than for display glasses.

Another requirement of optical glasses for use in augmented reality or virtual reality devices is low density (i.e., density less than 4.00 g/cm$^3$). As many augmented reality or virtual reality devices are made as wearable devices, the weight of the device is held by a user. Over an extended period of time, even a relatively light weight device can become cumbersome to wear. Thus, light, low-density glasses are desirable for use as optical glasses in augmented reality or virtual reality devices.

In addition to high refractive index and low density, optical glasses for use in augmented reality or virtual reality devices may also have good chemical durability so that they can withstand cleaning and various environmental conditions, as well as other mechanical properties that may prevent the optical glass from becoming damaged during use in an augmented reality or virtual reality device.

Accordingly, a need exists for glasses that have the above-mentioned attributes and are suitable for use in an augmented reality or virtual reality device.

SUMMARY

According to embodiments, a borate glass comprises: from greater than or equal to 25.0 mol % to less than or equal to 70.0 mol % $B_2O_3$; from greater than or equal to 0.0 mol % to less than or equal to 10.0 mol % $SiO_2$; from greater than or equal to 0.0 mol % to less than or equal to 15.0 mol % $Al_2O_3$; from greater than or equal to 3.0 mol % to less than or equal to 15.0 mol % $Nb_2O_5$; from greater than or equal to 0.0 mol % to less than or equal to 12.0 mol % alkali metal oxides; from greater than or equal to 0.0 mol % to less than or equal to 5.0 mol % ZnO; from greater than or equal to 0.0 mol % to less than or equal to 8.0 mol % $ZrO_2$; from greater than or equal to 0.0 mol % to less than or equal to 15.0 mol % $TiO_2$; less than 0.5 mol % $Bi_2O_3$; and less than 0.5 mol % $P_2O_5$, wherein a sum of $B_2O_3+Al_2O_3+SiO_2$ is from greater than or equal to 35.0 mol % to less than or equal to 76.0 mol %, a sum of CaO+MgO is from greater than or equal to 0.0 mol % to less than or equal to 35.5 mol %, the borate glass has a refractive index, measured at 587.6 nm, of greater than or equal to 1.70, the borate glass has a density of less than or equal to 4.50 g/cm$^3$, and the borate glass has an Abbe number, $V_D$, from greater than or equal to 20.0 to less than or equal to 47.0.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter.

DETAILED DESCRIPTION

Reference will now be made in detail to optical borate glasses according to various embodiments. Borate glasses have many advantages over conventional silicate glasses, for example, the density is small for high index glass (such as, for example, density <4.4 g/cm$^3$), the dispersion is low (such as, for example, a low abbe number: $V_D$ is from 21.0-46.3), have relatively low melting temperature comparing to silicate glasses, can accommodate much greater amount of BaO, $La_2O_3$ and $ZrO_2$ than silicate glasses and phosphate glasses, and could achieve comparable refractive indexes with the compositions free of components that are harmful to health or environment, such as, for example, arsenic (As), lead (Pb), cadmium (Cd), mercury (Hg), chromium (Cr), thallium (Tl), or vanadium (V). Compared to halide glasses, good chemical durability and thermal properties of borate glasses makes them superior host materials for rare-earth for the application of amplification.

In some embodiments of glass compositions described herein, the concentration of constituent components (e.g., $B_2O_3$, $Al_2O_3$, $SiO_2$, and the like) are given in mole percent (mol %) on an oxide basis, unless otherwise specified. Components of the optical borate glass composition according to embodiments are discussed individually below. It should be understood that any of the variously recited ranges of one component may be individually combined with any of the variously recited ranges for any other component.

In some embodiments of the optical borate glass compositions disclosed herein, $B_2O_3$ is the largest constituent and, as such, $B_2O_3$ is the primary constituent of the glass network formed from the glass composition. $B_2O_3$ may increase the viscosity of the glass composition due to its $B_{O4}$ tetrahedral coordination in a glass melt formed from a glass composition. When the concentration of $B_2O_3$ is balanced against the concentration of other glass network formers and the concentration of alkali oxides in the glass composition, $B_2O_3$ can reduce the liquidus temperature of the glass melt, thereby enhancing the liquidus viscosity and improving the compatibility of the glass composition with certain forming processes. Thus, $B_2O_3$ may be added in amounts that do not overly decrease these properties, and may improve the glass stability. In some embodiments, the glass composition may comprise $B_2O_3$ in amounts from greater than or equal to 25.0 mol % to less than or equal to 70.0 mol % and all ranges and sub-ranges between the foregoing values. In some embodiments, the glass composition comprises $B_2O_3$ in amounts greater than or equal to 30.0 mol %, greater than or equal to 35.0 mol %, greater than or equal to 40.0 mol %, greater than or equal to 45.0 mol %, greater than or equal to 50.0 mol %, greater than or equal to 55.0 mol %, greater than or equal to 60.0 mol %, or greater than or equal to 65.0 mol %. In some embodiments, the glass composition comprises $B_2O_3$ in amounts less than or equal to 65.0 mol %, less than or equal to 60.0 mol %, less than or equal to 55.0 mol %, less than or equal to 50.0 mol %, less than or equal to 45.0 mol %, less than or equal to 40.0 mol %, less than or equal to 35.0 mol %, or less than or equal to 30.0 mol %. It should be understood that, in some embodiments, any of the above ranges may be combined with any other range. However, in other embodiments, the glass composition comprises $B_2O_3$ in an amount from greater than or equal to 30.0 mol % to less than or equal to 65.0 mol %, from greater than or equal to 35.0 mol % to less than or equal to 60.0 mol %, from greater than or equal to 40.0 mol % to less than or equal to 55.0 mol %, or from greater than or equal to 45.0 mol % to less than or equal to 50.0 mol % and all ranges and sub-ranges between the foregoing values.

Like $B_2O_3$, $Al_2O_3$ may, in some embodiments, be added to the glass composition as a glass network former, and $Al_2O_3$ may increase the viscosity of the glass composition due to its $AlO_4$ tetrahedral or $AlO_6$ octahedral coordination in a glass melt formed from a glass composition, but may decrease the formability of the glass composition when the amount of $Al_2O_3$ is too high. In some embodiments, the glass composition generally comprises $Al_2O_3$ in a concentration of from greater than or equal to 0.0 mol % to less than or equal to 15.0 mol % and all ranges and sub-ranges between the foregoing values. In some embodiments, the glass composition comprises $Al_2O_3$ in amounts greater than or equal to 2.0 mol %, greater than or equal to 4.0 mol %, greater than or equal to 6.0 mol %, greater than or equal to 8.0 mol %, greater than or equal to 10.0 mol %, greater than or equal to 12.0 mol %, or greater than or equal to 14.0 mol. In some embodiments, the glass composition comprises $Al_2O_3$ in amounts less than or equal to 12.0 mol %, less than or equal to 10.0 mol %, less than or equal to 8.0 mol %, less than or equal to 6.0 mol %, less than or equal to 4.0 mol %, or less than or equal to 2.0 mol %. It should be understood that, in some embodiments, any of the above ranges may be combined with any other range. However, in other embodiments, the glass composition comprises $Al_2O_3$ in an amount from greater than or equal to 2.0 mol % to less than or equal to 12.0 mol %, such as from greater than or equal to 4.0 mol % to less than or equal to 10.0 mol %, or from greater than or equal to 6.0 mol % to less than or equal to 8.0 mol % and all ranges and sub-ranges between the foregoing values.

In some embodiments of the optical borate glass compositions disclosed herein, $SiO_2$ may be added as an additional glass network former. Pure $SiO_2$ has a relatively low coefficient of thermal expansion (CTE) and is alkali free. However, pure $SiO_2$ has a high melting point. Thus, the addition of $SiO_2$ may increase glass thermal stability. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass. In some embodiments, the glass composition generally comprises $SiO_2$ in an amount from greater than or equal to 0.0 mol % to less than or equal to 10.0 mol % and all ranges and sub-ranges between the foregoing values. In some embodiments, the glass composition comprises $SiO_2$ in amounts greater than or equal to 0.5 mol %, greater than or equal to 1.0 mol %, greater than or equal to 2.0 mol %, greater than or equal to 4.0 mol %, greater than or equal to 6.0 mol %, or greater than or equal to 8.0 mol %. In some embodiments, the glass composition comprises $SiO_2$ in amounts less than or equal to 8.0 mol %, less than or equal to 6.0 mol %, less than or equal to 4.0 mol %, less than or equal to 3.0 mol %, less than or equal to 2.0 mol %, less than or equal to 1.0 mol %, or less than or equal to 0.5 mol %. It should be understood that, in some embodiments, any of the above ranges may be combined with any other range. However, in other embodiments, the glass composition comprises $SiO_2$ in an amount from greater than or equal to 0.5 mol % to less than or equal to 8.0 mol %, from greater than or equal to 1.0 mol % to less than or equal to 6.0 mol %, or from greater than or equal to 2.0 mol % to less than or equal to 4.0 mol % and all ranges and sub-ranges between the foregoing values.

In some embodiments, the sum of the glass network formers $B_2O_3+Al_2O_3+SiO_2$ is from greater than or equal to 35.0 mol % to less than or equal to 76.0 mol % and all ranges and sub-ranges between the foregoing values. In some embodiments, the glass composition comprises a sum of the glass network formers $B_2O_3+Al_2O_3+SiO_2$ that is greater than or equal to 36.0 mol %, such as greater than or equal to 38.0 mol %, greater than or equal to 40.0 mol %, greater than or equal to 42.0 mol %, greater than or equal to 44.0 mol %, greater than or equal to 46.0 mol %, greater than or equal to 48.0 mol %, greater than or equal to 50.0 mol %, greater than or equal to 52.0 mol %, greater than or equal to 54.0 mol %, greater than or equal to 56.0 mol %, greater than or equal to 58.0 mol %, greater than or equal to 60.0 mol %, greater than or equal to 62.0 mol %, greater than or equal to 64.0 mol %, greater than or equal to 66.0 mol %, greater than or equal to 68.0 mol %, greater than or equal to 70.0 mol %, greater than or equal to 72.0 mol %, or greater than or equal to 74.0 mol %. In some embodiments, the sum of the glass network formers $B_2O_3+Al_2O_3+SiO_2$ is less than or equal to 74.0 mol %, such as less than or equal to 72.0 mol %, less than or equal to 70.0 mol %, less than or equal to 68.0 mol %, less than or equal to 66.0 mol %, less than or equal to 64.0 mol %, less than or equal to 62.0 mol %, less than or equal to 60.0 mol %, less than or equal to 58.0 mol %, less than or equal to 56.0 mol %, less than or equal to 54.0 mol %, less than or equal to 52.0 mol %, less than or equal to 50.0 mol %, less than or equal to 48.0 mol %, less than or equal to 46.0 mol %, less than or equal to 44.0 mol %, less than or equal to 42.0 mol %, less than or equal to 40.0 mol %, less than or equal to 38.0 mol %, or less than or equal to 36.0 mol %. It should be understood that, in some embodiments, any of the above ranges may be combined with any other range. However, in other embodiments, the glass composition comprises a sum of the glass network formers $B_2O_3+Al_2O_3+SiO_2$ in an amount from greater than or equal to 36.0 mol % to less than or equal to 74.0 mol %, from greater than or equal to 40.0 mol % to less than or equal to 70.0 mol %, from greater than or equal to 45.0 mol % to less than or equal to 65.0 mol %, or from greater than or equal to 50.0 mol % to less than or equal to 60.0 mol % and all ranges and sub-ranges between the foregoing values.

In addition to glass network formers, the addition of CaO lowers the viscosity of a glass. However, when too much CaO is added to the glass composition, crystallization and devitrification happen. Other effects of CaO in the glass are discussed above. In some embodiments, the glass composition generally comprises CaO in a concentration of from greater than or equal to 0.0 mol % to less than or equal to 35.0 mol % and all ranges and sub-ranges between the foregoing values. In some embodiments, the glass composition comprises CaO in amounts greater than or equal to 5.0 mol %, greater than or equal to 10.0 mol %, greater than or equal to 15.0 mol %, greater than or equal to 20.0 mol %, greater than or equal to 25.0 mol %, or greater than or equal to 30.0 mol %. In some embodiments, the glass composition comprises CaO in amounts less than or equal to 30.0 mol %, less than or equal to 25.0 mol %, less than or equal to 20.0 mol %, less than or equal to 15.0 mol %, less than or equal to 10.0 mol %, or less than or equal to 5.0 mol %. It should be understood that, in some embodiments, any of the above ranges may be combined with any other range. However, in other embodiments, the glass composition comprises CaO in an amount from greater than or equal to 5.0 mol % to less than or equal to 30.0 mol %, such as from greater than or equal to 10.0 mol % to less than or equal to 30.0 mol %, from greater than or equal to 15.0 mol % to less than or equal to 30.0 mol %, or from greater than or equal to 15.0 mol % to less than or equal to 25.0 mol % and all ranges and sub-ranges between the foregoing values.

Although MgO is a common alkaline earth metal that may be used as a substitute for CaO, in some embodiments of the optical borate glass disclosed and described herein, MgO is not included in the glass composition in any substantial amount. Thus, in some embodiments, the amount of MgO in the glass composition is less than 0.5 mol % and, in other embodiments, the glass composition does not contain MgO in any measurable amount. Accordingly, in at least some embodiments, the sum, in mol %, of CaO+MgO in the optical borate glass composition is approximately equal to the amount of CaO in the optical borate glass composition.

BaO lowers the viscosity of a glass and may enhance the glass formability, and enhance the Young's modulus, and may improve the RI of the glass. However, when too much BaO is added to the glass composition, the density of the glass composition increase, and crystallization and devitrification happen. In at least some embodiments, the glass composition generally comprises BaO in a concentration of from greater than or equal to 0.0 mol % to less than or equal to 55.0 mol % and all ranges and sub-ranges between the foregoing values. In some embodiments, the glass composition comprises BaO in amounts greater than or equal to 5.0 mol %, greater than or equal to 10.0 mol %, greater than or equal to 15.0 mol %, greater than or equal to 20.0 mol %, greater than or equal to 25.0 mol %, greater than or equal to 30.0 mol %, greater than or equal to 35.0 mol %, greater than or equal to 40.0 mol %, or greater than or equal to 45.0 mol %. In some embodiments, the glass composition comprises BaO in amounts less than or equal to 45.0 mol %, less than or equal to 40.0 mol %, less than or equal to 35.0 mol %, less than or equal to 30.0 mol %, less than or equal to 25.0 mol %, less than or equal to 20.0 mol % less than or equal to 15.0 mol %, less than or equal to 10.0 mol %, or less than or equal to 5.0 mol %. It should be understood that, in some embodiments, any of the above ranges may be combined with any other range. However, in other embodiments, the glass composition comprises BaO in an amount from greater than or equal to 5.0 mol % to less than or equal to 45.0 mol %, such as from greater than or equal to 10.0 mol % to less than or equal to 40.0 mol %, from greater than or equal to 15.0 mol % to less than or equal to 40.0 mol %, from greater than or equal to 20.0 mol % to less than or equal to 40.0 mol %, from greater than or equal to 20.0 mol % to less than or equal to 35.0 mol %, or from greater than or equal to 25.0 mol % to less than or equal to 35.0 mol % and all ranges and sub-ranges between the foregoing values.

SrO lowers the viscosity of a glass, and may enhance the formability, and enhance the Young's modulus, and may improve the RI of the glass. However, when too much SrO is added to the glass composition, the density of the glass composition increases, and crystallization and devitrification happen. In at least some embodiments, the glass composition generally comprises SrO in a concentration of from greater than or equal to 0.0 mol % to less than or equal to 8.0 mol % and all ranges and sub-ranges between the foregoing values. In some embodiments, the glass composition comprises SrO in amounts greater than or equal to 0.1 mol %, greater than or equal to 0.5 mol %, greater than or equal to 1.0 mol %, greater than or equal to 1.5 mol %, greater than or equal to 2.0 mol %, greater than or equal to 2.5 mol %, greater than or equal to 3.0 mol %, greater than or equal to 3.5 mol %, greater than or equal to 4.0 mol %, greater than or equal to 4.5 mol %, greater than or equal to 5.0 mol %, greater than or equal to 5.5 mol %, greater than or equal to 6.0 mol %, greater than or equal to 6.5 mol %, greater than or equal to 7.0 mol %, or greater than or equal to 7.5 mol %. In some embodiments, the glass composition comprises SrO in amounts less than or equal to 7.5 mol %, less than or equal to 7.0 mol %, less than or equal to 6.5 mol %, less than or equal to 6.0 mol %, less than or equal to 5.5 mol %, less than or equal to 5.0 mol % less than or equal to 4.5 mol %, less than or equal to 4.0 mol %, less than or equal to 3.5 mol %, less than or equal to 3.0 mol %, less than or equal to 2.5 mol %, less than or equal to 2.0 mol %, less than or equal to 1.5 mol %, less than or equal to 1.0 mol %, less than or equal to 0.5 mol %, or less than or equal to 0.1 mol %. It should be understood that, in embodiments, any of the above ranges may be combined with any other range. However, in other embodiments, the glass composition comprises SrO in an amount from greater than or equal to 0.1 mol % to less than or equal to 5.0 mol %, such as from greater than or equal to 0.5 mol % to less than or equal to 4.0 mol %, or from greater than or equal to 0.5 mol % to less than or equal to 3.0 mol % and all ranges and sub-ranges between the foregoing values.

$La_2O_3$ may be added to the optical borate glass composition to increase the RI of the optical borate glass. In some embodiments, the glass composition generally comprises $La_2O_3$ in a concentration of from greater than or equal to 0.0 mol % to less than or equal to 30.0 mol % and all ranges and sub-ranges between the foregoing values. In some embodiments, the glass composition comprises $La_2O_3$ in amounts greater than or equal to 4.0 mol %, greater than or equal to 5.0 mol %, greater than or equal to 10.0 mol %, greater than or equal to 15.0 mol %, greater than or equal to 20.0 mol %, or greater than or equal to 25.0 mol. In some embodiments, the glass composition comprises $La_2O_3$ in amounts less than or equal to 25.0 mol %, less than or equal to 20.0 mol %, less than or equal to 15.0 mol %, less than or equal to 10.0 mol %, less than or equal to 5.0 mol %, or less than or equal to 4.0 mol %. It should be understood that, in embodiments, any of the above ranges may be combined with any other range. However, in other embodiments, the glass composition comprises $La_2O_3$ in an amount from greater than or equal to 4.0 mol % to less than or equal to 25.0 mol %, such as from greater than or equal to 4.0 mol % to less than or equal to 20.0 mol %, from greater than or equal to 4.0 mol % to less than or equal to 15.0 mol %, from greater than or equal to 5.0 mol % to less than or equal to 20.0 mol %, or from greater than or equal to 5.0 mol % to less than or equal to 15.0 mol % and all ranges and sub-ranges between the foregoing values.

$Nb_2O_5$ may be added to the optical borate glass composition to increase the RI and glass formability of the optical borate glass. In some embodiments, the glass composition generally comprises $Nb_2O_5$ in a concentration of from greater than or equal to 3.0 mol % to less than or equal to 15.0 mol % and all ranges and sub-ranges between the foregoing values. In some embodiments, the glass composition comprises $Nb_2O_5$ in amounts greater than or equal to 4.0 mol %, greater than or equal to 6.0 mol %, greater than or equal to 8.0 mol %, greater than or equal to 10.0 mol %, greater than or equal to 12.0 mol %, or greater than or equal to 14.0 mol %. In some embodiments, the glass composition comprises $Nb_2O_5$ in amounts less than or equal to 14.0 mol %, less than or equal to 12.0 mol %, less than or equal to 10.0 mol %, less than or equal to 8.0 mol %, less than or equal to 6.0 mol %, or less than or equal to 4.0 mol %. It should be understood that, in embodiments, any of the above ranges may be combined with any other range. However, in other embodiments, the glass composition comprises $Nb_2O_5$ in an amount from greater than or equal to 4.0 mol % to less than or equal to 14.0 mol %, such as from greater than or equal to 4.0 mol % to less than or equal to 12.0 mol %, from greater than or equal to 4.0 mol % to less than or equal to 10.0 mol %, from greater than or equal to 5.0 mol % to less than or equal to 12.0 mol %, or from greater than or equal to 5.0 mol % to less than or equal to 10.0 mol % and all ranges and sub-ranges between the foregoing values.

In addition to the above components, the optical borate glass, according to one or more embodiments, may include alkali metal oxides, such as, for example, $Li_2O$, $Na_2O$, and $K_2O$. The alkali metal oxides may be added to modify various properties of the glass composition, such as, for example, melting temperature, viscosity, mechanical strength, and chemical durability. In some embodiments, the glass composition generally comprises $Li_2O$ in a concentration of from greater than or equal to 0.0 mol % to less than or equal to 12.0 mol % and all ranges and sub-ranges between the foregoing values. In some embodiments, the glass composition comprises $Li_2O$ in amounts greater than or equal to 1.0 mol %, greater than or equal to 2.0 mol %, greater than or equal to 4.0 mol %, greater than or equal to 6.0 mol %, greater than or equal to 8.0 mol %, or greater than or equal to 10.0 mol %. In some embodiments, the glass composition comprises $Li_2O$ in amounts less than or equal to 10.0 mol %, less than or equal to 8.0 mol %, less than or equal to 6.0 mol %, less than or equal to 4.0 mol %, less than or equal to 2.0 mol %, or less than or equal to 1.0 mol %. It should be understood that, in some embodiments, any of the above ranges may be combined with any other range. However, in other embodiments, the glass composition comprises $Li_2O$ in an amount from greater than or equal to 1.0 mol % to less than or equal to 10.0 mol %, such as from greater than or equal to 1.0 mol % to less than or equal to 8.0 mol %, from greater than or equal to 2.0 mol % to less than or equal to 10.0 mol %, or from greater than or equal to 2.0 mol % to less than or equal to 8.0 mol % and all ranges and sub-ranges between the foregoing values.

In some embodiments, the glass composition generally comprises $Na_2O$ in a concentration of from greater than or equal to 0.0 mol % to less than or equal to 10.0 mol % and all ranges and sub-ranges between the foregoing values. In some embodiments, the glass composition comprises $Na_2O$ in amounts greater than or equal to 0.5 mol %, greater than or equal to 1.0 mol %, greater than or equal to 2.0 mol %, greater than or equal to 4.0 mol %, greater than or equal to 6.0 mol %, or greater than or equal to 8.0 mol %. In some embodiments, the glass composition comprises $Na_2O$ in amounts less than or equal to 8.0 mol %, less than or equal to 6.0 mol %, less than or equal to 4.0 mol %, less than or equal to 2.0 mol %, less than or equal to 1.0 mol %, or less than or equal to 0.5 mol %. It should be understood that, in embodiments, any of the above ranges may be combined with any other range. However, in other embodiments, the glass composition comprises $Na_2O$ in an amount from greater than or equal to 0.0 mol % to less than or equal to 8.0 mol %, such as from greater than or equal to 0.0 mol % to less than or equal to 6.0 mol %, from greater than or equal to 0.0 mol % to less than or equal to 4.0 mol %, from greater than or equal to 0.5 mol % to less than or equal to 8.0 mol %, or from greater than or equal to 1.0 mol % to less than or equal to 4.0 mol % and all ranges and sub-ranges between the foregoing values.

In at least some embodiments, the sum of all alkali metal oxides in the optical borate glass composition may be from greater than or equal to 0.0 mol % to less than or equal to 12.0 mol %, such as from greater than or equal to 1.0 mol % to less than or equal to 10.0 mol %, such as from greater than or equal to 1.0 mol % to less than or equal to 8.0 mol %, from greater than or equal to 2.0 mol % to less than or equal to 10.0 mol %, or from greater than or equal to 2.0 mol % to less than or equal to 8.0 mol % and all ranges and sub-ranges between the foregoing values.

Transition metal oxides in addition to $Nb_2O_5$, discussed above, such as, for example, $ZnO$, $TiO_2$, $ZrO_2$, and $Y_2O_3$ may be added to optical borate glass according to embodiments, to increase the refractive index. In some embodiments, the glass composition generally comprises $ZnO$ in a concentration of from greater than or equal to 0.0 mol % to less than or equal to 5.0 mol % and all ranges and sub-ranges between the foregoing values. In some embodiments, the glass composition comprises $ZnO$ in amounts greater than or equal to 1.0 mol %, greater than or equal to 2.0 mol %, greater than or equal to 3.0 mol %, or greater than or equal to 4.0 mol %. In some embodiments, the glass composition comprises $ZnO$ in amounts less than or equal to 4.0 mol %, less than or equal to 3.0 mol %, less than or equal to 2.0 mol %, or less than or equal to 1.0 mol %. It should be understood that, in embodiments, any of the above ranges may be combined with any other range. However, in other embodiments, the glass composition comprises $ZnO$ in an amount from greater than or equal to 0.0 mol % to less than or equal to 4.0 mol %, such as from greater than or equal to 1.0 mol % to less than or equal to 3.0 mol % and all ranges and sub-ranges between the foregoing values.

In some embodiments, the glass composition generally comprises $ZrO_2$ in a concentration of from greater than or equal to 0.0 mol % to less than or equal to 8.0 mol % and all ranges and sub-ranges between the foregoing values. In some embodiments, the glass composition comprises $ZrO_2$ in amounts greater than or equal to 1.0 mol %, greater than or equal to 2.0 mol %, greater than or equal to 3.0 mol %, greater than or equal to 4.0 mol %, greater than or equal to 5.0 mol %, greater than or equal to 6.0 mol %, or greater than or equal to 7.0 mol %. In some embodiments, the glass composition comprises $ZrO_2$ in amounts less than or equal to 7.0 mol %, less than or equal to 6.0 mol %, less than or equal to 5.0 mol %, less than or equal to 4.0 mol %, less than or equal to 3.0 mol %, less than or equal to 2.0 mol %, or less than or equal to 1.0 mol %. It should be understood that, in embodiments, any of the above ranges may be combined with any other range. However, in other embodiments, the glass composition comprises $ZrO_2$ in an amount from greater than or equal to 1.0 mol % to less than or equal to 7.0 mol %, such as from greater than or equal to 2.0 mol % to less than or equal to 6.0 mol %, from greater than or equal to 3.0 mol % to less than or equal to 6.0 mol %, or from greater than or equal to 4.0 mol % to less than or equal to 6.0 mol % and all ranges and sub-ranges between the foregoing values.

In some embodiments, the glass composition generally comprises $TiO_2$ in a concentration of from greater than or equal to 0.0 mol % to less than or equal to 15.0 mol % and all ranges and sub-ranges between the foregoing values. In some embodiments, the glass composition comprises $TiO_2$ in amounts greater than or equal to 1.0 mol %, greater than or equal to 2.0 mol %, greater than or equal to 3.0 mol %, greater than or equal to 4.0 mol %, greater than or equal to 5.0 mol %, greater than or equal to 6.0 mol %, greater than or equal to 7.0 mol %, greater than or equal to 8.0 mol %, greater than or equal to 9.0 mol %, greater than or equal to 10.0 mol %, greater than or equal to 11.0 mol %, greater than or equal to 12.0 mol %, greater than or equal to 13.0 mol %, or greater than or equal to 14.0 mol %. In some embodiments, the glass composition comprises $TiO_2$ in amounts less than or equal to 14.0 mol %, less than or equal to 13.0 mol %, less than or equal to 12.0 mol %, less than or equal to 11.0 mol %, less than or equal to 10.0 mol %, less than or equal to 10.0 mol %, less than or equal to 9.0 mol %, less than or equal to 8.0 mol %, less than or equal to 7.0 mol %, less than or equal to 6.0 mol %, less than or equal to 5.0 mol %, less than or equal to 4.0 mol %, less than or equal to 3.0 mol %, less than or equal to 2.0 mol %, or less than or equal to 1.0 mol %. It should be understood that, in embodiments, any of the above ranges may be combined with any other range. However, in other embodiments, the glass composition comprises $TiO_2$ in an amount from greater than or equal to 1.0 mol % to less than or equal to 14.0 mol %, such as from greater than or equal to 2.0 mol % to less than or equal to 12.0 mol %, from greater than or equal to 4.0 mol % to less than or equal to 10.0 mol %, or from greater than or equal to 5.0 mol % to less than or equal to 10.0 mol % and all ranges and sub-ranges between the foregoing values.

Other components may, in embodiments, be added to the optical borate glass in small amounts as fining agents. Such fining agents include $CeO_2$, $F^-$, $Cl^-$, sulfates, and sulfides. In some embodiments, the sum of all fining agents in the optical borate glass composition may be from greater than or equal to 0.0 mol % to less than or equal to 2.0 mol %, such as from greater than or equal to 0.5 mol % to less than or equal to 1.5 mol %. In other embodiments, the optical borate glass may comprise fining agents in amounts less than or equal to 1.0 mol %, less than or equal to 0.7 mol %, less than or equal to 0.5 mol %, less than or equal to 0.2 mol %, or less than or equal to 0.1 mol % and all ranges and sub-ranges between the foregoing values.

In one or more embodiments, various components are present in the optical borate glass composition in limited amounts. The amount of these components may be controlled for a number of reasons such as, for example, the components are harmful to the environment, toxic to humans, costly, or negatively impact the properties of the glass composition. For example, although $Bi_2O_3$ increases the refractive index of the glass composition, $Bi_2O_3$ also rapidly increases the density of the glass composition. Accordingly, in embodiments, little or no $Bi_2O_3$ is added to the glass composition. Some embodiments of the optical borate glass comprise less than 0.5 mol % $Bi_2O_3$, such as less than or equal to 0.2 mol % $Bi_2O_3$, or less than or equal to 0.1 mol % $Bi_2O_3$. Some embodiments of the optical borate glass are free from $Bi_2O_3$ in any measurable amount.

In at least some embodiments, little or no $P_2O_5$ is added to the glass composition. Some embodiments of the optical borate glass comprise less than 0.5 mol % $P_2O_5$, such as less than or equal to 0.2 mol % $P_2O_5$, or less than or equal to 0.1 mol % $P_2O_5$. Other embodiments of the optical borate glass are free from $P_2O_5$ in any measurable amount.

In addition to $Bi_2O_3$ and $P_2O_5$, the amounts of other components in the optical borate glass may be controlled. In some embodiments, the sum, in mol %, of $Ta_2O_5$+tungsten oxides+$Er_2O_3$+$TeO_2$+$Gd_2O_3$ is less than 0.5 mol %, such as less than or equal to 0.2 mol %, or less than or equal to 0.1 mol %. In other embodiments of the optical borate glass the sum of $Ta_2O_5$+tungsten oxides+$Er_2O_3$+$TeO_2$+$Gd_2O_3$ is not measurable.

In some embodiments, the optical borate glass may be free from one or more of lead, arsenic, thallium, cadmium, vanadium, mercury, and chromium. As used herein, the term "free from" indicates that the glass component was not included in the glass design and, if present at all, are present in amounts less than 100 ppm.

It was found that the optical borate glass according to embodiments disclosed and described herein can be formulated to have beneficial properties. Notably, transition metal elements may be added to the borate glass composition to increase the RI of the optical borate glass. It was previously unexpected that components such as transition metal elements could be added to borate glasses in amounts that could significantly increase the RI of the glass composition without also hindering other properties of the glass composition, such as the glass transition temperature ($T_g$), liquidus temperature, and liquidus viscosity. However, it was found that sufficient amounts of transition metal elements could be added to the glass composition to significantly increase the RI without unduly hindering other properties of the optical borate glass composition. Various properties of optical borate glasses disclosed and described in embodiments herein are discussed below.

The refractive index of optical borate glasses disclosed in embodiments may be affected by the addition of transition metal elements into the glass composition. In particular, the additions of lanthanum and niobium oxides in the glass composition increase the RI of the glass composition. In one or more embodiments, the RI was measured by Metricon Model 2010 Prism Coupler. Index of refraction measurements were performed on the Metricon Model 2010 Prism Coupler at wavelengths of 406 nm, 473 nm, 532 nm, 633 nm, 790 nm and 981 nm using various laser sources. The Metricon 2010 prism coupler operates as a fully automated refractometer, in which the refractive index of bulk materials and/or films can be measured. Refractive indices of bulk materials, such as the provided glass samples, are measured by the Metricon 2010 Prism Coupler. Measured index of refraction results were fitted to a Cauchy dispersion equation and constants were determined. The refractive index for optical glasses, $n_D$, is specified at a wavelength of 587.6 nm (Helium d-line). Using fitted index dispersion values, the $V_D$ Abbe number is calculated for each glass composition. In one or more embodiments, the optical borate glass may have a RI, measured at 587.6 nm, of greater than or equal to 1.70, greater than or equal to 1.71, greater than or equal to 1.72, greater than or equal to 1.73, greater than or equal to 1.74, greater than or equal to 1.75, greater than or equal to 1.76, greater than or equal to 1.77, greater than or equal to 1.78, greater than or equal to 1.79, or greater than or equal to 1.80. In some embodiments, the optical borate glass may have a RI, measured at 587.6 nm, of less than or equal to 1.82, less than or equal to 1.81, less than or equal to 1.80, less than or equal to 1.79, less than or equal to 1.78, less than or equal to 1.77, less than or equal to 1.76, less than or equal to 1.75, less than or equal to 1.74, less than or equal to 1.73, less than or equal to 1.72, or less than or equal to 1.71. It should be understood that, in embodiments, any of the above ranges may be combined with any other range. However, in other embodiments, the optical borate glass may have a RI, measured at 587.6 nm, from greater than or equal to 1.70 to less than or equal to 1.82, such as from greater than or equal to 1.72 to less than or equal to 1.81, from greater than or equal to 1.74 to less than or equal to 1.78, or from greater than or equal to 1.76 to less than or equal to 1.78 and all ranges and sub-ranges between the foregoing values.

As disclosed above, the density of the optical borate glass may, in one or more embodiments, be relatively low. In some embodiments, the density were measured according to ASTM C693, and the density of the optical borate glass may be less than or equal to 4.50 g/cm$^3$, such as less than or equal to 4.40 g/cm$^3$, less than or equal to 4.30 g/cm$^3$, less than or equal to 4.20 g/cm$^3$, less than or equal to 4.10 g/cm$^3$, less than or equal to 4.00 g/cm$^3$, less than or equal to 3.90 g/cm$^3$, less than or equal to 3.80 g/cm$^3$, less than or equal to 3.70 g/cm$^3$, less than or equal to 3.60 g/cm$^3$, less than or equal to 3.50 g/cm$^3$, or less than or equal to 3.40 g/cm$^3$. In one or more embodiments, the density of the optical borate glass composition may be from greater than or equal to 3.00 g/cm$^3$ to less than or equal to 4.50 g/cm$^3$, such as from greater than or equal to 3.00 g/cm$^3$ to less than or equal to 4.40 g/cm$^3$, from greater than or equal to 3.00 g/cm$^3$ to less than or equal to 4.30 g/cm$^3$, from greater than or equal to 3.00 g/cm$^3$ to less than or equal to 4.20 g/cm$^3$, from greater than or equal to 3.00 g/cm$^3$ to less than or equal to 4.10 g/cm$^3$, from greater than or equal to 3.00 g/cm$^3$ to less than or equal to 4.00 g/cm$^3$, from greater than or equal to 3.00 g/cm$^3$ to less than or equal to 3.90 g/cm$^3$, from greater than or equal to 3.00 g/cm$^3$ to less than or equal to 3.80 g/cm$^3$, from greater than or equal to 3.00 g/cm$^3$ to less than or equal to 3.70 g/cm$^3$, from greater than or equal to 3.00 g/cm$^3$ to less than or equal to 3.60 g/cm$^3$, from greater than or equal to 3.00 g/cm$^3$ to less than or equal to 3.50 g/cm$^3$, or from greater than or equal to 3.00 g/cm$^3$ to less than or equal to 3.40 g/cm$^3$ and all ranges and sub-ranges between the foregoing values.

Optical borate glasses according to embodiments have relatively low dispersion as defined by the Abbe number (also referred to as the V-number). Using fitted index dispersion values, the $V_D$ Abbe number is calculated for each glass composition. The Abbe number, $V_D$, of an optical glass may be determined by the following Equation 1:

$$V_D = \frac{n_D - 1}{n_F - n_C} \quad (1)$$

Where $n_D$ is the refractive index of the glass measured at 587.6 nm, $n_F$ is the refractive index of the glass measured at 486.1 nm, and $n_c$ is the refractive index of the glass measured at 656.3 nm. In some embodiments, the $V_D$ value of the optical borate glass is from greater than or equal to 20.0 to less than or equal to 47.0 and all ranges and sub-ranges between the foregoing values. In some embodiments, the $V_D$ value of the optical borate glass is greater than or equal to 22.0, greater than or equal to 24.0, greater than or equal to 26.0, greater than or equal to 28.0, greater than or equal to 30.0, greater than or equal to 32.0, greater than or equal to 34.0, greater than or equal to 36.0, greater than or equal to 38.0, greater than or equal to 40.0, greater than or equal to 42.0, or greater than or equal to 44.0. In one or more embodiments, the $V_D$ value of the optical borate glass is less than or equal to 44.0, less than or equal to 42.0, less than or equal to 40.0, less than or equal to 38.0, less than or equal to 36.0, less than or equal to 34.0, less than or equal to 32.0, less than or equal to 30.0, less than or equal to 28.0, less than or equal to 26.0, less than or equal to 24.0, or less than or equal to 22.0. It should be understood that, in embodiments, any of the above ranges may be combined with any other range. However, in other embodiments, the $V_D$ value of the optical borate glass is from greater than or equal to 22.0 to less than or equal to 44.0, from greater than or equal to 24.0 to less than or equal to 42.0, from greater than or equal to 26.0 to less than or equal to 40.0, from greater than or equal to 28.0 to less than or equal to 38.0, or from greater than or equal to 30.0 to less than or equal to 36.0 and all ranges and sub-ranges between the foregoing values.

In some embodiments, the Young's modulus, shear modulus and Poisons ratio was measured by Resonant Ultrasound Spectroscopy, and the instrument model is Quasar RUSpec 4000 by Magnaflux. In embodiments, the Young's modulus of the optical borate glass is from greater than or equal to 75.0 GPa to less than or equal to 120.0 GPa, such as from greater than or equal to 80.0 GPa to less than or equal to 115.0 GPa, from greater than or equal to 85.0 GPa to less than or equal to 110.0 GPa, from greater than or equal to 90.0 GPa to less than or equal to 105.0 GPa, or from greater than or equal to 95.0 GPa to less than or equal to 100.0 GPa and all ranges and sub-ranges between the foregoing values.

In embodiments, the $T_g$ were measured by differential scanning calorimetry (Netzsch DSC 404 F1 Pegasus) with ramp rate of 10° C./min in argon, $T_g$ may be from greater than or equal to 500° C. to less than or equal to 690° C., such as from greater than or equal to 510° C. to less than or equal to 680° C., from greater than or equal to 520° C. to less than or equal to 670° C., from greater than or equal to 530° C. to less than or equal to 660° C., from greater than or equal to 540° C. to less than or equal to 650° C., from greater than or equal to 550° C. to less than or equal to 640° C., from greater than or equal to 560° C. to less than or equal to 630° C., from greater than or equal to 570° C. to less than or equal to 620° C., from greater than or equal to 580° C. to less than or equal to 610° C., or from greater than or equal to 590° C. to less than or equal to 600° C. and all ranges and sub-ranges between the foregoing values.

According to embodiments, the liquidus temperature of the glass composition is from greater than or equal to 900° C. to less than or equal to 1250° C., such as from greater than or equal to 910° C. to less than or equal to 1240° C., from greater than or equal to 920° C. to less than or equal to 1230° C., from greater than or equal to 930° C. to less than or equal to 1220° C., from greater than or equal to 940° C. to less than or equal to 1210° C., from greater than or equal to 950° C. to less than or equal to 1200° C., from greater than or equal to 960° C. to less than or equal to 1190° C., from greater than or equal to 970° C. to less than or equal to 1180° C., from greater than or equal to 980° C. to less than or equal to 1170° C., from greater than or equal to 990° C. to less than or equal to 1160° C., from greater than or equal to 1000° C. to less than or equal to 1150° C. from greater than or equal to 1010° C. to less than or equal to 1140° C., from greater than or equal to 1020° C. to less than or equal to 1130° C., from greater than or equal to 1030° C. to less than or equal to 1120° C., from greater than or equal to 1040° C. to less than or equal to 1110° C. and all ranges and sub-ranges between the foregoing values. The liquidus temperature is measured according to ASTM C829-81 Standard Practices for Measurement of Liquidus Temperature of Glass by the Gradient Furnace Method.

In one or more embodiments, the $T_{x\ onset}$-$T_g$ value of the glass composition is from greater than or equal to 100° C. to less than or equal to 200° C., such as from greater than or equal to 105° C. to less than or equal to 195° C., from greater than or equal to 110° C. to less than or equal to 190° C., from greater than or equal to 115° C. to less than or equal to 185° C., from greater than or equal to 120° C. to less than or equal to 180° C., from greater than or equal to 125° C. to less than or equal to 175° C., from greater than or equal to 130° C. to less than or equal to 170° C., from greater than or equal to 135° C. to less than or equal to 165° C., from greater than or equal to 140° C. to less than or equal to 160° C., or from greater than or equal to 145° C. to less than or equal to 155° C. and all ranges and sub-ranges between the foregoing values. $T_{x\ onset}$-$T_g$ is the temperature difference between the first onset crystallization peak and the glass transition temperate in DSC curve.

In embodiments, the coefficient of thermal expansion (CTE) of the glass composition is from greater than or equal to 6.00 ppm/° C. to less than or equal to 9.50 ppm/° C., such as from greater than or equal to 6.10 ppm/° C. to less than or equal to 9.40 ppm/° C., from greater than or equal to 6.20 ppm/° C. to less than or equal to 9.30 ppm/° C., from greater than or equal to 6.25 ppm/° C. to less than or equal to 9.25 ppm/° C., from greater than or equal to 6.30 ppm/° C. to less than or equal to 9.20 ppm/° C., from greater than or equal to 6.40 ppm/° C. to less than or equal to 9.10 ppm/° C., from greater than or equal to 6.50 ppm/° C. to less than or equal to 9.00 ppm/° C., from greater than or equal to 6.60 ppm/° C. to less than or equal to 8.90 ppm/° C., from greater than or equal to 6.70 ppm/° C. to less than or equal to 8.80 ppm/° C., from greater than or equal to 6.75 ppm/° C. to less than or equal to 8.75 ppm/° C., from greater than or equal to 6.80 ppm/° C. to less than or equal to 8.70 ppm/° C., from greater than or equal to 6.90 ppm/° C. to less than or equal to 8.60 ppm/° C., from greater than or equal to 7.00 ppm/° C. to less than or equal to 8.50 ppm/° C., from greater than or equal to 7.10 ppm/° C. to less than or equal to 8.40 ppm/° C., from greater than or equal to 7.20 ppm/° C. to less than or equal to 8.30 ppm/° C., from greater than or equal to 7.25 ppm/° C. to less than or equal to 8.25 ppm/° C. from greater than or equal to 7.30 ppm/° C. to less than or equal to 8.20 ppm/° C., from greater than or equal to 7.40 ppm/° C. to less than or equal to 8.10 ppm/° C., from greater than or equal to 7.50 ppm/° C. to less than or equal to 8.00 ppm/° C., from greater than or equal to 7.60 ppm/° C. to less than or equal to 7.90 ppm/° C., or from greater than or equal to 7.70 ppm/° C. to less than or equal to 7.80 ppm/° C. and all ranges and sub-ranges between the foregoing values. The CTE is measured according to ASTM E228.

The chemical durability of the glass may be measured by the following advanced optics (AO) test. The AO test is conducted by etching dried samples in 10 wt % HCl for 10 min at 25° C. After etching for 10 minutes, the samples were quenched in de-ionized (DI) water and rinsed in 18 MΩ water, and then dried by high-pure nitrogen gas and placed in a desiccator overnight. Weight loss normalized to surface area (mg/mm$^2$) is then calculated and provided as the AO test result. In one or more embodiments, the AO test results of the glass composition is from greater than or equal to 0.0005 mg/mm$^2$ to less than or equal to 0.6000 mg/mm$^2$, from greater than or equal to 0.0010 mg/mm$^2$ to less than or equal to 0.5500 mg/mm$^2$, from greater than or equal to 0.0020 mg/mm$^2$ to less than or equal to 0.5000 mg/mm$^2$, from greater than or equal to 0.0050 mg/mm$^2$ to less than or equal to 0.4500 mg/mm$^2$, from greater than or equal to 0.0060 mg/mm$^2$ to less than or equal to 0.4000 mg/mm$^2$, from greater than or equal to 0.0070 mg/mm$^2$ to less than or equal to 0.3500 mg/mm$^2$, from greater than or equal to 0.0080 mg/mm$^2$ to less than or equal to 0.3000 mg/mm$^2$, from greater than or equal to 0.0090 mg/mm$^2$ to less than or equal to 0.2500 mg/mm$^2$, from greater than or equal to 0.0100 mg/mm$^2$ to less than or equal to 0.2000 mg/mm$^2$, from greater than or equal to 0.0200 mg/mm$^2$ to less than or equal to 0.1500 mg/mm$^2$, from greater than or equal to 0.0300 mg/mm$^2$ to less than or equal to 0.1000 mg/mm$^2$, from greater than or equal to 0.0400 mg/mm$^2$ to less than or equal to 0.0900 mg/mm$^2$, from greater than or equal to 0.0500 mg/mm$^2$ to less than or equal to 0.0800 mg/mm$^2$, or from greater than or equal to 0.0600 mg/mm$^2$ to less than or equal to 0.0700 mg/mm$^2$ and all ranges and sub-ranges between the foregoing values.

The chemical durability of the glass composition may also be measured by the Nano Strip 2× test, which is conducted by submerging dried samples in 600 mL of Nanostrip 2× solution (Capitol Scientific, 85% $H_2SO_4$ and <1% $H_2O_2$) for 50 min at 70° C. with a stir at 400 rpm speed. The ratio of surface area to volume used in this test is 0.08 cm$^{-1}$. After 50 minutes, the samples were quenched in DI water and rinsed in 18 MΩ water, and then dried by high-pure nitrogen gas and placed in a desiccator for overnight. Weight loss normalized to surface area (mg/mm$^2$) is then calculated and provided as the Nano Strip 2× test result. In embodiments, the Nano Strip 2× test result is from greater than or equal to 0.001 mg/mm$^2$ to less than or equal to 0.013 mg/mm$^2$, such as from greater than or equal to 0.002 mg/mm$^2$ to less than or equal to 0.011 mg/mm$^2$, from greater than or equal to 0.003 mg/mm$^2$ to less than or equal to 0.010 mg/mm$^2$, from greater than or equal to 0.004 mg/mm$^2$ to less than or equal to 0.009 mg/mm$^2$, from greater than or equal to 0.005 mg/mm$^2$ to less than or equal to 0.008 mg/mm$^2$, or from greater than or equal to 0.006 mg/mm$^2$ to less than or equal to 0.007 mg/mm$^2$ and all ranges and sub-ranges between the foregoing values.

The Poisson's ratio of the glass composition may, in one or more embodiments, be from greater than or equal to 0.260 to less than or equal to 0.320, such as from greater than or equal to 0.265 to less than or equal to 0.315, from greater than or equal to 0.270 to less than or equal to 0.310, from greater than or equal to 0.275 to less than or equal to 0.305, from greater than or equal to 0.280 to less than or equal to 0.300, or from greater than or equal to 0.285 to less than or equal to 0.295 and all ranges and sub-ranges between the foregoing values. The Poisson's ratio is measured by Resonant Ultrasound Spectroscopy, and the instrument model is Quasar RUSpec 4000 by Magnaflux.

In embodiments, the shear modulus of the glass composition may be from greater than or equal to 29.5 GPa to less than or equal to 47.0 GPa, such as from greater than or equal to 30.0 GPa to less than or equal to 46.5 GPa, from greater than or equal to 30.5 GPa to less than or equal to 46.0 GPa, from greater than or equal to 31.0 GPa to less than or equal to 45.5 GPa, from greater than or equal to 31.5 GPa to less than or equal to 45.0 GPa, from greater than or equal to 32.0

GPa to less than or equal to 44.5 GPa, from greater than or equal to 32.5 GPa to less than or equal to 44.0 GPa, from greater than or equal to 33.0 GPa to less than or equal to 43.5 GPa, from greater than or equal to 33.5 GPa to less than or equal to 43.0 GPa, from greater than or equal to 34.0 GPa to less than or equal to 42.5 GPa, from greater than or equal to 34.5 GPa to less than or equal to 42.0 GPa, from greater than or equal to 35.0 GPa to less than or equal to 41.5 GPa, from greater than or equal to 35.5 GPa to less than or equal to 41.0 GPa, from greater than or equal to 36.0 GPa to less than or equal to 40.5 GPa, from greater than or equal to 36.5 GPa to less than or equal to 40.0 GPa, from greater than or equal to 37.0 GPa to less than or equal to 39.5 GPa, from greater than or equal to 37.5 GPa to less than or equal to 39.0 GPa, or from greater than or equal to 38.0 GPa to less than or equal to 38.5 GPa and all ranges and sub-ranges between the foregoing values. The shear modulus is measured by Resonant Ultrasound Spectroscopy, and the instrument model is Quasar RUSpec 4000 by Magnaflux.

According to one or more embodiments, the stress optical coefficient (SOC) of the glass composition is from greater than or equal to 2.35 nm/mm/MPa to less than or equal to 2.70 nm/mm/MPa, such as from greater than or equal to 2.40 nm/mm/MPa to less than or equal to 2.65 nm/mm/MPa, from greater than or equal to 2.45 nm/mm/MPa to less than or equal to 2.60 nm/mm/MPa, or from greater than or equal to 2.50 nm/mm/MPa to less than or equal to 2.55 nm/mm/MPa and all ranges and sub-ranges between the foregoing values. The SOC is measured according to ASTM C770-16 Procedure C, Glass Disc Method, for multiple points/fitting the points.

As disclosed above, optical borate glasses according to embodiments disclosed and described herein may be used in augmented reality devices, virtual reality devices, optical fibers, or optical lenses.

According to a first clause, the borate glasses described herein may comprise: from greater than or equal to 25.0 mol % to less than or equal to 70.0 mol % $B_2O_3$; from greater than or equal to 0.0 mol % to less than or equal to 10.0 mol % $SiO_2$; from greater than or equal to 0.0 mol % to less than or equal to 15.0 mol % $Al_2O_3$; from greater than or equal to 3.0 mol % to less than or equal to 15.0 mol % $Nb_2O_5$; from greater than or equal to 0.0 mol % to less than or equal to 12.0 mol % alkali metal oxides; from greater than or equal to 0.0 mol % to less than or equal to 5.0 mol % ZnO; from greater than or equal to 0.0 mol % to less than or equal to 7.5 mol % $ZrO_2$; from greater than or equal to 0.0 mol % to less than or equal to 15.0 mol % $TiO_2$; less than 0.5 mol % $Bi_2O_3$; and less than 0.5 mol % $P_2O_5$, wherein a sum of $B_2O_3+Al_2O_3+SiO_2$ is from greater than or equal to 35.0 mol % to less than or equal to 76.0 mol %, a sum of CaO+MgO is from greater than or equal to 0.0 mol % to less than or equal to 35.5 mol %, the has a refractive index, measured at 587.6 nm, of greater than or equal to 1.70, the borate glass has a density of less than or equal to 4.50 g/cm$^3$, and the borate glass has an Abbe number, $V_D$, from greater than or equal to 20.0 to less than or equal to 47.0.

A second clause comprises a borate glass according to the first clause, wherein the borate glass comprises from greater than or equal to 0.0 mol % to less than or equal to 30.0 mol % $La_2O_3$.

A third clause comprises a borate glass according to any one of the first and second clauses, wherein the borate glass comprises from greater than or equal to 5.0 mol % to less than or equal to 15.0 mol % $La_2O_3$.

A fourth clause comprises a borate glass according to any one of the first to third clauses, wherein the borate glass comprises from greater than or equal to 4.0 mol % to less than or equal to 10.0 mol % $Nb_2O_5$.

A fifth clause comprises a borate glass according to any one of the first to fourth clauses, wherein the borate glass comprises from greater than or equal to 0.0 mol % to less than or equal to 55.0 mol % BaO.

A sixth clause comprises a borate glass according to any one of the first to fifth clauses, wherein the borate glass comprises from greater than or equal to 10.0 mol % to less than or equal to 40.0 mol % BaO.

A seventh clause comprises a borate glass according to any one of the first to sixth clauses, wherein the borate glass comprises from greater than or equal to 0.0 mol % to less than or equal to 8.0 mol % SrO.

An eighth clause comprises a borate glass according to any one of the first to seventh clauses, wherein the borate glass comprises from greater than or equal to 35.0 mol % to less than or equal to 60.0 mol % $B_2O_3$.

A ninth clause comprises a borate glass according to any one of the first to eighth clauses, wherein the borate glass comprises from greater than or equal to 0.0 mol % to less than or equal to 12.0 mol % $Li_2O$.

A tenth clause comprises a borate glass according to any one of the first to ninth, wherein the borate glass comprises from greater than or equal to 0.0 mol % to less than or equal to 10.0 mol % $Na_2O$.

An eleventh clause comprises a borate glass according to any one of the first to tenth clauses, wherein the borate glass is free of $Bi_2O_3$ and $P_2O_5$.

A twelfth clause comprises a borate glass according to any one of the first to eleventh clauses, wherein the borate glass comprises $CeO_2$ in an amount less than or equal to 0.5 mol %.

A thirteenth clause comprises a borate glass according to any one of the first to twelfth clauses, wherein a sum of $Ta_2O_5$+tungsten oxides+$Er_2O_3$+$TeO_2$+$Gd_2O_3$ is less than 0.5 mol %.

A fourteenth clause comprises a borate glass according to any one of the first to thirteenth clauses, wherein the borate glass is free from one or more of lead, arsenic, thallium, cadmium, vanadium, mercury, and chromium.

A fifteenth clause comprises a borate glass according to any one of the first to fourteenth clauses, wherein the borate glass comprises from greater than or equal to 4.0 mol % to less than or equal to 10.0 mol % $Al_2O_3$.

A sixteenth clause comprises a borate glass according to any one of the first to fifteenth clauses, wherein the borate glass comprises from greater than or equal to 40.0 mol % to less than or equal to 55.0 mol % $B_2O_3$.

A seventeenth clause comprises a borate glass according to any one of the first to sixteenth clauses, wherein the borate glass comprises from greater than or equal to 5.0 mol % to less than or equal to 30.0 mol % CaO.

An eighteenth clause comprises a borate glass according to any one of the first to seventeenth clauses, wherein the borate glass has a refractive index, measured at 589.3 nm, from greater than or equal to 1.70 to less than or equal to 1.82.

A nineteenth clause comprises a borate glass according to any one of the first to eighteenth clauses, wherein the borate glass has a density from greater than or equal to 3.00 g/cm$^3$ to less than or equal to 4.50 g/cm$^3$.

A twentieth clause comprises a borate glass according to any one of the first to nineteenth clauses, wherein the borate glass has an Abbe number, $V_D$, from greater than or equal to 24.0 to less than or equal to 42.0.

A twenty first clause comprises a borate glass according to any of the first to twentieth clauses, wherein the borate glass has a Young's modulus from greater than or equal to 75.0 GPa to less than or equal to 120.0 GPa.

A twenty second clause comprises a borate glass according to any of the first to twenty first clauses, wherein the borate glass has a glass transition temperature from greater than or equal to 500° C. to less than or equal to 690° C.

A twenty third clause comprises a borate glass according to any of the first to twenty second clauses, wherein the borate glass has a CTE from greater than or equal to 6.00 ppm/° C. to less than or equal to 9.50 ppm/° C.

A twenty fourth clause comprises a borate glass according to any of the first to twenty third clauses, wherein the borate glass has a $T_{x\ onset}-T_g$ value of the glass composition is from greater than or equal to 100° C. to less than or equal to 200° C.

A twenty fifth clause comprises a borate glass according to any of the first to twenty fourth clauses, wherein the borate glass has a liquidus temperature from greater than or equal to 900° C. to less than or equal to 1250° C.

EXAMPLES

Embodiments will be further clarified by the following examples. It should be understood that these examples are not limiting to the embodiments described above.

Representative glass compositions and properties are summarized in Tables 1 and 2, respectively. Table 1 lists disclosed examples of glass compositions. Glasses were made from batches (e.g., glass melts of 1000 g 100% theoretical yield; typical yields were about 900 g or 90 wt % due to, e.g., mechanical loss) of source or starting materials including, for example, $B_2O_3$ (Chemical Distributors Inc., 98.69%), $Al_2O_3$ (Almatis, 99.78%), $SiO_2$ (MinTec, 99.999%), $Li_2CO_3$ (ChemPoint (FMC)), $Na_2CO_3$ (Fisher Scientific, 99.99%), $CaCO_3$ (Fisher Scientific, 99.9%), $BaCO_3$ (AMREX Chemical), ZnO (Zochem Inc. Distributor: Meyers Chemical Inc.), $ZrO_2$ (MEL Chemicals PRC), $TiO_2$ (Harry W Gaffney, 99.68%), $La_2O_3$ (MolyCorp), and $Nb_2O_5$ (Alfa Aesar), that were melted in Pt crucibles at from 1300° C. to 1500° C. in air with an aluminum cover.

TABLE 1

| Sample | $SiO_2$ | $Al_2O_3$ | $B_2O_3$ | $Li_2O$ | $Na_2O$ | MgO | CaO | BaO | SrO | ZnO | $ZrO_2$ | $TiO_2$ | $La_2O_3$ | $Nb_2O_5$ | $CeO_2$ |
|---|---|---|---|---|---|---|---|---|---|---|---|---|---|---|---|
| 1 | | | 49.36 | | | | 30.34 | | | | | | 10.30 | 10.00 | |
| 2 | | | 59.19 | | | | 20.45 | | | | | | 10.24 | 10.12 | |
| 3 | | | 46.14 | | | | 14.05 | 20.78 | | | | | 9.49 | 9.53 | |
| 4 | | | 46.03 | | | | 14.14 | 20.55 | | 4.66 | | | 9.87 | 4.76 | |
| 5 | | | 45.84 | | | | 14.26 | 21.06 | | 0.00 | | 4.68 | 9.46 | 4.70 | |
| 6 | | | 52.62 | | | | 9.63 | 13.80 | | 4.79 | | | 9.65 | 9.51 | |
| 7 | | | 59.56 | | | | 25.44 | | | | | | 10.05 | 4.94 | |
| 8 | | 4.48 | 48.26 | | | | 8.94 | 19.95 | | | | | 13.73 | 4.64 | |
| 9 | | 9.23 | 46.87 | | | | 4.23 | 20.95 | | | | | 14.21 | 4.51 | |
| 10 | | 14.09 | 47.44 | | | | | 20.32 | | | | | 13.66 | 4.49 | |
| 11 | | 9.70 | 60.07 | | | | | | | | | | 25.17 | 5.06 | |
| 12 | | 9.23 | 65.87 | | | | | | | | | | 19.88 | 5.01 | |
| 13 | 0.27 | 4.96 | 51.23 | 1.91 | 0.01 | 0.07 | 10.05 | | | | 5.03 | 5.19 | 15.16 | 6.01 | 0.10 |
| 14 | 0.37 | 5.78 | 48.86 | 1.90 | 0.02 | 0.12 | 15.45 | | | | 5.63 | 10.47 | 5.19 | 6.18 | 0.03 |
| 15 | 0.31 | 5.87 | 44.64 | 1.94 | 0.01 | 0.12 | 15.75 | | | | 4.88 | 14.90 | 5.25 | 6.29 | 0.03 |
| 16 | 7.00 | 2.93 | 39.24 | 1.91 | 0.15 | 0.15 | 20.71 | | | | 5.52 | 11.11 | 5.29 | 5.95 | 0.03 |
| 17 | 5.12 | 4.95 | 39.48 | 1.91 | 0.02 | 0.15 | 20.54 | | | | 4.98 | 11.50 | 5.08 | 6.23 | 0.03 |
| 18 | 3.22 | 6.72 | 39.89 | 1.94 | 0.01 | 0.15 | 20.30 | | | | 4.99 | 11.27 | 5.33 | 6.13 | 0.03 |
| 19 | 5.99 | | 32.02 | 3.71 | | | | 49.64 | 0.43 | | | | | 8.20 | |
| 20 | 7.16 | | 31.94 | 3.67 | | | | 48.14 | 0.47 | | | 4.68 | | 3.94 | |
| 21 | 6.00 | | 32.86 | 3.73 | | | | 44.05 | 0.51 | | | | 8.57 | 4.29 | |
| 22 | 5.68 | | 33.61 | 3.83 | | | | 39.05 | 0.48 | | | 4.34 | 8.50 | 4.51 | |
| 23 | 6.24 | | 35.96 | 4.11 | | | 13.99 | 20.85 | 0.32 | | | 4.62 | 9.30 | 4.61 | |
| 24 | 5.33 | | 39.63 | 4.45 | | | 30.28 | | 0.16 | | | 5.00 | 9.99 | 5.17 | 0.05 |
| 25 | 5.43 | | 39.44 | 9.01 | | | 25.57 | | 0.16 | | | 5.09 | 10.05 | 5.24 | 0.05 |
| 26 | 6.36 | 1.06 | 41.82 | 1.40 | | | 27.27 | | 0.16 | | | 5.44 | 10.90 | 5.60 | 0.06 |
| 27 | 6.33 | 1.31 | 42.10 | 1.38 | | | 21.66 | | 0.09 | | 5.30 | 10.78 | 5.49 | 5.58 | |
| 28 | 4.85 | | 39.93 | 9.54 | | | 21.22 | | | | | 4.99 | 9.76 | 4.99 | 4.71 |
| 29 | 4.83 | | 39.66 | 9.62 | | | 26.42 | | | | | 4.99 | 4.88 | 4.92 | 4.68 |
| 30 | 9.91 | | 39.66 | 9.71 | | | 21.26 | | | | | 4.96 | 4.90 | 4.95 | 4.65 |
| 31 | 4.85 | | 44.38 | 9.75 | | | 21.31 | | | | | 5.09 | 4.91 | 5.03 | 4.70 |
| 32 | 4.91 | | 49.22 | 9.68 | | | 21.47 | | | | | 5.01 | | 4.99 | 4.73 |
| 33 | 4.94 | | 44.18 | 9.72 | | | 21.19 | | | | | 7.50 | | 7.56 | 4.90 |
| 34 | 5.18 | 3.93 | 42.28 | 1.94 | | | 21.83 | | | | | 5.04 | 9.98 | 5.02 | 4.82 |
| 35 | 4.77 | 3.90 | 42.21 | 2.03 | | | 11.15 | 7.46 | 3.60 | | | 5.00 | 9.90 | 5.11 | 4.86 |
| 36 | 5.74 | 3.77 | 41.27 | 1.93 | | | 5.38 | 14.41 | 3.47 | | | 4.87 | 9.58 | 4.84 | 4.73 |
| 37 | 4.95 | 3.92 | 42.42 | 1.98 | | | | 14.77 | 7.24 | | | 5.01 | 9.81 | 5.06 | 4.83 |
| 38 | 5.65 | 3.74 | 40.31 | 1.98 | | | | 21.18 | 3.41 | | | 4.82 | 9.43 | 4.83 | 4.64 |
| 39 | 7.30 | 5.22 | 42.98 | | | | 20.14 | | | | | 4.82 | 9.82 | 4.91 | 4.81 |
| 40 | 7.20 | 5.20 | 42.64 | 3.88 | | | 16.54 | | | | | 4.80 | 9.89 | 4.93 | 4.92 |
| 41 | 7.13 | 5.24 | 43.19 | 7.70 | | | 12.36 | | | | | 4.81 | 9.79 | 4.95 | 4.83 |
| 42 | 6.93 | 5.18 | 43.03 | 11.52 | | | 8.29 | | | | | 5.14 | 9.95 | 4.96 | 4.98 |

Various properties of the glasses formed according to Table 1 are provided below in Table 2 and are measured as described hereinabove.

TABLE 2

| Sample | Density g/cm³ | $n_D$ | $V_D$ | $T_g$ °C. | Anneal °C. | Soft °C. | Liquidus °C. | $T_{x\,onset}$-$T_g$ °C. | CTE ppm/°C. | AO losses mg/mm² |
|---|---|---|---|---|---|---|---|---|---|---|
| 1 | 3.792 | 1.8041 | 21.08 | 636 | 620 | 704 | 1130 | 122 | 8.11 | 1.16E−02 |
| 2 | 3.628 | 1.7686 | 38.46 | 634 | 618 | 707 | 1055 | 136 | 6.88 | 4.60E−03 |
| 3 | 4.100 | 1.7927 | 39.96 | 628 | 614 | 696 |  | 153 | 8.54 | 1.38E−02 |
| 4 | 4.048 | 1.7519 | 44.21 | 610 | 595 | 687 |  | 192 |  | 7.36E−02 |
| 5 | 4.037 | 1.7752 | 41.95 | 623 | 607 | 690 |  | 170 | 8.78 | 3.28E−02 |
| 6 | 3.970 | 1.7847 | 39.43 | 617 | 604 | 692 |  | 152 | 7.43 | 8.40E−03 |
| 7 | 3.552 | 1.7285 | 44.83 | 647 | 629 | 718 |  | ~150 | 7.48 | 2.24E−02 |
| 8 | 4.148 | 1.7597 | 45.44 | 618 | 604 | 694 |  | 136 | 8.76 | 1.42E−02 |
| 9 | 4.078 | 1.7465 | 45.34 | 615 | 604 | 698 | 1125 | 139 | 8.19 | 5.41E−03 |
| 10 | 3.992 | 1.7335 | 44.94 | 615 | 602 | 704 | 1125 | 155 | 7.53 | 2.85E−03 |
| 11 | 4.180 | 1.7740 | 45.28 | 658 | 641 | 734 | 1100 | 148 | 6.91 | 1.28E−03 |
| 12 | 3.859 | 1.7396 | 46.24 | 651 | 636 | 732 | 1070 | ~170 | 6.29 | 1.30E−03 |
| 13 | 3.971 | 1.8050 | 42.26 | 627 | 612 | 709 | 955 | 145 | 8.1 | 8.61E−04 |
| 14 | 3.361 | 1.7727 | 35.14 | 600 | 586 | 690 | 1040 | 135 | 7.86 | 9.81E−04 |
| 15 | 3.435 | 1.8041 | 29.93 | 600 | 589 | 690 | 1230 | 126 | 7.98 | 5.34E−04 |
| 16 | 3.500 | 1.8031 | 34.13 | 612 | 597 | 699 | 1020 | 152 | 8.16 |  |
| 17 | 3.492 | 1.8000 | 32.38 | 608 | 591 | 697 | 1040 | 153 | 8.21 |  |
| 18 | 3.476 | 1.7966 | 33.18 | 604 | 591 | 696 | 1040 | 146 | 8.34 |  |
| 19 | 4.404 | 1.7508 | 42.92 | 547 | 538 | 636 | 1100 | 183 |  | 5.68E−01 |
| 20 | 4.268 | 1.7282 | 43.03 | 539 | 530 | 628 |  | 136 |  | 3.88E−01 |
| 21 | 4.168 | 1.7570 | 38.45 | 562 | 551 | 649 |  | 186 |  | 1.41E−01 |
| 22 | 4.339 | 1.7718 | 39.76 | 565 | 555 | 653 | 1085 | 174 |  | 1.18E−01 |
| 23 | 3.718 | 1.7698 | 39.80 | 598 | 572 | 672 | 1070 | 188 |  | 4.29E−02 |
| 24 | 4.041 | 1.7699 | 38.81 | 581 | 587 | 683 | 990 | 193 |  | 1.94E−02 |
| 25 | 3.662 | 1.7548 | 39.21 | 563 | 556 | 656 | 1020 | 178 |  | 3.00E−02 |
| 26 | 3.774 | 1.7836 | 39.48 | 622 | 608 | 705 | 975 | ~130 |  | 4.33E−03 |
| 27 | 3.509 | 1.7961 | 32.92 | 617 | 603 | 703 | 1000 | 147 |  | 5.67E−04 |
| 28 | 3.491 | 1.7962 | 33.51 | 556 | 546 | 639 | 980 | 167 | 8.75 | 1.43E−03 |
| 29 | 3.481 | 1.7714 | 39.22 | 552 | 543 | 633 |  | 178 | 8.97 | 5.03E−03 |
| 30 | 3.433 | 1.7612 | 39.92 | 562 | 548 | 644 | 950 | 175 | 8.43 | 2.51E−03 |
| 31 | 3.413 | 1.7593 | 37.44 | 560 | 548 | 641 | 945 | 175 | 8.34 | 3.70E−03 |
| 32 | 3.334 | 1.7236 | 44.87 | 563 | 552 | 641 | 935 | 180 | 8.14 | 1.07E−02 |
| 33 | 3.618 | 1.7589 | 42.53 | 563 | 549 | 642 | 1005 | 184 | 8.52 | 4.45E−03 |
| 34 | 3.422 | 1.7730 | 29.30 | 607 | 593 | 696 | 1015 | 173 | 7.15 | 5.63E−04 |
| 35 | 3.615 | 1.7775 | 35.84 | 606 | 591 | 692 | 1000 | 170 | 7.31 | 1.07E−03 |
| 36 | 3.727 | 1.7773 | 34.65 | 595 | 583 | 687 | 980 | 178 | 7.49 | 9.92E−04 |
| 37 | 3.788 | 1.7774 | 35.84 | 597 | 587 | 686 | 980 | 179 | 7.61 | 1.08E−03 |
| 38 | 3.840 | 1.7783 | 35.46 | 593 | 580 | 683 | 975 | 185 | 7.75 | 1.30E−03 |
| 39 | 3.389 | 1.7665 | 34.98 | 625 | 615 | 710 | 1015 | 157 | 6.85 | 5.06E−04 |
| 40 | 3.364 | 1.7656 | 35.32 | 586 | 577 | 678 | 1010 | 184 | 6.86 | 5.07E−04 |
| 41 | 3.334 | 1.7636 | 35.45 | 556 | 558 | 650 | 1015 | 156 | 7.11 | 1.15E−03 |
| 42 | 3.295 | 1.7587 | 34.27 | 530 | 543 | 635 | 1010 | 174 | 7.55 | 4.64E−03 |

| Sample | Nanostrip mg/mm² | Poissons Ratio | Shear Modulus GPa | Youngs Modulus GPa | SOC nm/mm/Mpa |
|---|---|---|---|---|---|
| 1 |  | 0.284 | 43.3 | 111.3 |  |
| 2 |  | 0.276 | 42.2 | 107.6 |  |
| 3 |  | 0.293 | 39.7 | 102.6 |  |
| 4 |  | 0.291 | 38.2 | 98.7 |  |
| 5 |  | 0.289 | 39.1 | 100.9 |  |
| 6 |  | 0.279 | 40.3 | 103.1 |  |
| 7 |  |  |  |  |  |
| 8 |  | 0.287 | 38.2 | 98.4 |  |
| 9 |  | 0.295 | 37.3 | 96.6 |  |
| 10 |  | 0.291 | 36.2 | 93.4 |  |
| 11 |  | 0.293 | 43.6 | 112.9 |  |
| 12 |  | 0.282 | 42.4 | 108.8 |  |
| 13 | 2.66E−03 | 0.285 | 45.7 | 117.3 |  |
| 14 | 1.11E−03 | 0.277 | 29.7 | 75.9 |  |
| 15 | 1.57E−03 | 0.279 | 42.3 | 108.2 | 2.671 |
| 16 | 2.33E−03 | 0.278 | 44.3 | 113.2 |  |
| 17 | 2.32E−03 | 0.281 | 43.7 | 111.9 | 2.465 |
| 18 | 2.29E−03 | 0.28 | 43.0 | 110.0 | 2.512 |
| 19 |  | 0.3 | 30.9 | 80.4 |  |
| 20 |  | 0.297 | 29.8 | 77.4 |  |
| 21 |  | 0.284 | 32.3 | 82.9 |  |
| 22 |  | 0.291 | 33.6 | 86.9 |  |
| 23 |  | 0.291 | 37.4 | 96.6 |  |
| 24 |  | 0.28 | 41.4 | 106.0 |  |
| 25 |  | 0.296 | 39.5 | 101.6 |  |

TABLE 2-continued

| | | | | | |
|---|---|---|---|---|---|
| 26 | | 0.287 | 44.3 | 114.1 | |
| 27 | | 0.275 | 44.3 | 113.0 | 2.379 |
| 28 | 7.23E-03 | 0.269 | 46.6 | 118.2 | |
| 29 | 1.28E-02 | 0.276 | 45.7 | 116.5 | |
| 30 | 5.98E-03 | 0.268 | 45.6 | 115.7 | |
| 31 | 7.97E-03 | 0.269 | 45.5 | 115.4 | |
| 32 | 1.23E-02 | 0.275 | 44.4 | 113.3 | |
| 33 | 1.24E-02 | 0.279 | 45.7 | 116.8 | |
| 34 | 1.98E-03 | 0.277 | 43.2 | 110.3 | |
| 35 | 2.98E-03 | 0.279 | 41.2 | 105.4 | |
| 36 | 4.41E-03 | 0.278 | 39.2 | 100.2 | |
| 37 | 4.68E-03 | 0.282 | 38.8 | 99.4 | |
| 38 | 5.95E-03 | 0.28 | 37.8 | 96.7 | |
| 39 | 1.83E-03 | 0.276 | 41.3 | 105.3 | |
| 40 | 1.82E-03 | 0.277 | 42.0 | 107.3 | |
| 41 | 1.84E-03 | 0.273 | 42.2 | 107.5 | |
| 42 | 5.94E-03 | 0.271 | 41.2 | 104.7 | |

All compositional components, relationships, and ratios described in this specification are provided in mol % unless otherwise stated. All ranges disclosed in this specification include any and all ranges and subranges encompassed by the broadly disclosed ranges whether or not explicitly stated before or after a range is disclosed.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A borate glass, comprising:
from greater than or equal to 25.0 mol % to less than or equal to 70.0 mol % $B_2O_3$;
from greater than or equal to 0.0 mol % to less than or equal to 10.0 mol % $SiO_2$;
from greater than or equal to 0.0 mol % to less than or equal to 15.0 mol % $Al_2O_3$;
from greater than or equal to 3.0 mol % to less than or equal to 15.0 mol % $Nb_2O_5$;
from greater than or equal to 0.0 mol % to less than or equal to 12.0 mol % alkali metal oxides;
from greater than or equal to 0.0 mol % to less than or equal to 5.0 mol % ZnO;
from greater than or equal to 0.0 mol % to less than or equal to 8.0 mol % $ZrO_2$;
from greater than or equal to 0.0 mol % to less than or equal to 15.0 mol % $TiO_2$;
less than 0.5 mol % $Bi_2O_3$; and
less than 0.5 mol % $P_2O_5$, wherein
a sum of $B_2O_3+Al_2O_3+SiO_2$ is from greater than or equal to 35.0 mol % to less than or equal to 76.0 mol %,
a sum of CaO+MgO is from greater than or equal to 15.0 mol % to less than or equal to 35.5 mol %,
from greater than or equal to 15.0 mol % to less than or equal to 30.0 mol % CaO,
the borate glass has a refractive index, measured at 587.6 nm, of greater than or equal to 1.70,
the borate glass has a density of less than or equal to 4.50 g/cm³, and
the borate glass has an Abbe number, $V_D$, from greater than or equal to 20.0 to less than or equal to 47.0.

2. The borate glass of claim 1, wherein the borate glass comprises from greater than or equal to 0.0 mol % to less than or equal to 30.0 mol % $La_2O_3$.

3. The borate glass of claim 1, wherein the borate glass comprises from greater than or equal to 0.0 mol % to less than or equal to 55.0 mol % BaO.

4. The borate glass of claim 1, wherein the borate glass comprises from greater than or equal to 0.0 mol % to less than or equal to 8.0 mol % SrO.

5. The borate glass of claim 1, wherein the borate glass comprises from greater than or equal to 20.0 mol % to less than or equal to 30.0 mol % CaO.

6. The borate glass of claim 1, wherein the borate glass comprises from greater than or equal to 35.0 mol % to less than or equal to 60.0 mol % $B_2O_3$.

7. The borate glass of claim 1, wherein the borate glass comprises from greater than or equal to 0.0 mol % to less than or equal to 12.0 mol % $Li_2O$.

8. The borate glass of claim 1, wherein the borate glass comprises from greater than or equal to 0.0 mol % to less than or equal to 10.0 mol % $Na_2O$.

9. The borate glass of claim 1, wherein the borate glass comprises from greater than or equal to 0.0 mol % to less than or equal to 0.5 mol % $CeO_2$.

10. The borate glass of claim 1, wherein a sum of $Ta_2O_5$+tungsten oxides+$Er_2O_3$+$TeO_2$+$Gd_2O_3$ is less than 0.5 mol %.

11. The borate glass of claim 1, wherein the borate glass is free of $Bi_2O_3$ and $P_2O_5$.

12. The borate glass of claim 1, wherein the borate glass is free from one or more of lead, arsenic, thallium, cadmium, vanadium, mercury, and chromium.

13. The borate glass of claim 1, wherein the borate glass has a refractive index, measured at 587.6 nm, from greater than or equal to 1.70 to less than or equal to 1.82.

14. The borate glass of claim 1, wherein the borate glass has a density from greater than or equal to 3.00 g/cm³ to less than or equal to 4.50 g/cm³.

15. The borate glass of claim 1, wherein the borate glass has an Abbe number, $V_D$, from greater than or equal to 24.0 to less than or equal to 42.0.

16. The borate glass of claim 1, wherein the borate glass has a Young's modulus from greater than or equal to 75.0 GPa to less than or equal to 120.0 GPa.

17. The borate glass of claim 1, wherein the borate glass has a glass transition temperature from greater than or equal to 500° C. to less than or equal to 690° C.

18. The borate glass of claim 1, wherein the borate glass has a CTE from greater than or equal to 6.00 ppm/° C. to less than or equal to 9.50 ppm/° C.

19. The borate glass of claim 1, wherein the borate glass has a $T_{x\ onset}-T_g$ value of the borate glass is from greater than or equal to 100° C. to less than or equal to 200° C.

20. The borate glass of claim 1, wherein the borate glass has a liquidus temperature from greater than or equal to 900° C. to less than or equal to 1250° C.

\* \* \* \* \*

UNITED STATES PATENT AND TRADEMARK OFFICE
CERTIFICATE OF CORRECTION

| | |
|---|---|
| PATENT NO. | : 11,319,243 B2 |
| APPLICATION NO. | : 16/247161 |
| DATED | : May 3, 2022 |
| INVENTOR(S) | : Xiaoju Guo et al. |

It is certified that error appears in the above-identified patent and that said Letters Patent is hereby corrected as shown below:

On the Title Page

In item (56), in Column 2, under "Other Publications", Line 7, delete "Advanves" and insert -- Advances --.

In item (56), in Column 2, under "Other Publications", Line 15, delete "Prodiction" and insert -- Production --.

Signed and Sealed this
Eighteenth Day of October, 2022

Katherine Kelly Vidal
*Director of the United States Patent and Trademark Office*